Patented July 7, 1936

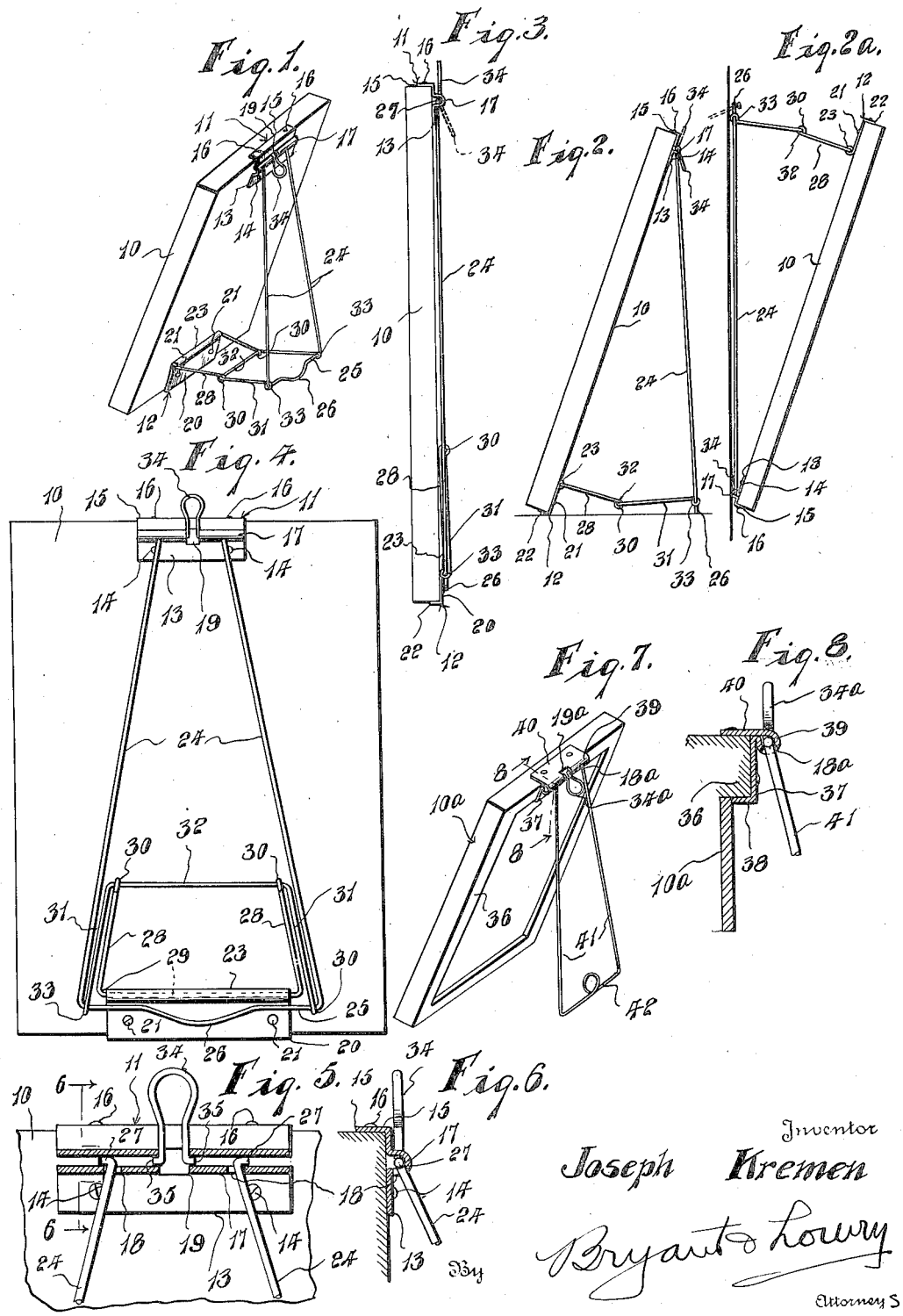

2,047,075

UNITED STATES PATENT OFFICE 2,047,075

MIRROR AND PICTURE SUPPORT

Joseph Kremen, Chicago, Ill.

Application June 15, 1935, Serial No. 26,850

2 Claims. (Cl. 248—37)

This invention relates to certain new and useful improvements in mirror and picture support.

The primary object of the invention is to provide a support for mirrors and for pictures wherein the frame of the mirror or picture may be mounted in an upright position on a table or other support or be wall suspended.

A further object of the invention is to provide a support for the frame of a mirror, picture or the like with a support in the form of a sectionally hinged wire frame adapted when extended to provide an easel support for the mirror or picture and to be folded into flat engagement with the back of the mirror or picture to permit juxtaposition of the mirror or picture to the surface of a wall when the same is to be suspended.

A still further object of the invention is to provide a novel form of anchor plate for attachment to the frame of a mirror or picture and to which the support is hingedly connected.

With the above and other objects in view that will become apparent as the nature of the invention is better understood, the same consists in the novel form, combination and arrangement of parts hereinafter more fully described, shown in the accompanying drawing and claimed.

In the drawing:—

Figure 1 is a perspective view of a mirror or picture frame with the sectionally hinged support therefor in extended position;

Figure 2 is a side elevational view of the same in extended position; Figure 2a shows the frame in inverted suspended form;

Figure 3 is a side elevational view with the sectionally hinged support folded to a position flatly engaged with the back of the mirror or picture;

Figure 4 is a rear elevational view of the mirror or picture with the hinged support folded for flat engagement therewith;

Figure 5 is a fragmentary elevational view, partly in section, showing one of the anchor plates for the support;

Figure 6 is a detail sectional view taken on line 6—6 of Figure 5;

Figure 7 is a perspective view of another form of mirror or picture support; and—

Figure 8 is a detail sectional view taken on line 8—8 of Figure 7.

While the support disclosed herein is adaptable for association with mirror and picture frames, the same can be attached to other articles for holding the latter in upright positions on a table or suspending them from a wall and for purpose of clarity, the support will be described as associated with a picture frame. While the picture frame 10 may be of any shape or form desired, the same is illustrated as being rectangular and the support for the picture frame 10 comprises a wire frame formed of hinged sections with the outer ends of the end sections hingedly attached to anchor plates 11 and 12 respectively carried by the upper and lower edges of the frame 10 as illustrated.

The anchor plate 11 as shown more clearly in Figures 4 to 6 is of angle formation and comprises a latch plate 13 adapted for engagement with the rear face of the picture frame 10 and to be anchored thereto as at 14 while the angularly directed flange 15 at the upper edge of the plate 13 extends over and engages the upper edge of the picture frame 10 and in turn is anchored thereto as at 16. A bead or channel portion 17 projects laterally and longitudinally of the anchor plate 13 intermediate the upper and lower edges thereto and said channel portion 17 is provided with a pair of openings 18 in the underside thereof, respectively adjacent opposite ends of the channel portion while the intermediate portion of the channel 17 is cut away as at 19 for purposes presently to appear.

The anchor plate 12 associated with the lower edge of the picture frame 10 is also of angle formation as shown in Figs. 1 to 4 and comprises a flat plate 20 anchored as at 21 to the rear face of the picture frame 10 with an angularly directed flange 22 at the lower edge of the plate 20 to underlie and engage the lower edge of the frame. The upper edge of the plate 20 is rolled into tubular formation as at 23 to form the barrel of a hinge with which the support is associated.

The support for the picture frame 10 comprises a wire frame formed of hingedly connected sections preferably three in number, the end sections of the wire frame being respectively connected to the anchor plate and their opposite ends connected by the intermediate section of the wire frame. One end section of the support is slightly less in length than the length of the picture frame and is of substantially U-shape having a pair of side legs 24 connected at adjacent ends by a cross wire 25 providing a supporting foot with an intermediate arched portion 26 to be engaged with a table or other support. The free ends of the side legs 24 as shown more clearly in Figure 5 are bent outwardly as at 27 and are adapted to be inserted into the openings 18 at the lower side of the channel portion 17 of the anchor plate 11, the legs 24 being resilient and inherently normally spread apart with the angle ends 27 thereof constituting hooks to overlie the adjacent edges of the openings 18 to retain the section of the support in the anchor plate.

The other end section of the wire frame support is of U-shape and comprises side legs 28 connected by a cross wire 29 that freely extends through the anchor plate barrel 23 for hinge movement therein with an eyelet 30 formed at each free end of the legs 28. The intermediate section of the wire frame support is also of U-shape and comprises side legs 31 connected by a cross wire 32 that extends through the eyes 30 of the legs 28 for hinge movement therein and each leg 31 has an eye 33 at its free end to receive the cross wire 25 of the other end section of the wire frame support.

A U-shaped hanger 34 has the free end of each side leg thereof bent outwardly as at 35 to provide a hook and said leg ends are adapted to be inserted in the cut-away portion 19 of the channel portion 17 of the anchor plate with the hooked ends 35 thereof extended into opposite ends of the channel portions for pivotal support as will be evident from an inspection of Figure 5.

When the picture frame is adapted to be supported on a table or the like, the wire frame support is extended as illustrated in Figures 1 and 2, and the intermediate and end sections of the wire frame support associated with the lower anchor plate 12 permit increased angularity between the picture frame 10 and legs 24 for the safe support of the picture frame in an upright position as illustrated. With the wire frame so disposed, the intermediate portion 26 of the cross wire 25 engages the table support while the hinge connection between the intermediate section and the section associated with the anchor plate 12 is disposed in a plane below the upper edge of the anchor plate 12 and the point of connection between the intermediate section of the frame and the section that is engaged with the upper anchor plate 11 to avoid accidental closing or folding movement of the support.

The wire frame support is illustrated in Figs. 3 and 4 in its folded position and the several sections thereof are moved into engagement with the rear face of the picture frame 10 to permit the latter to be positioned in contact with the surface of a wall when the picture frame is suspended by means of the hanger 34.

In the form of invention shown in Figures 7 and 8, the picture frame 10a has a marginal flange 36 and the anchor plate for the support is associated with the flange at the upper side of the frame. The anchor plate comprises a plate section 37 flatly engaging the rear face of the flange 36 with a lower angle edge 38 to underlie the flange, the upper edge of the plate section 37 being rolled to provide a barrel portion 39 and a plate extension 40 at right angles to the plate section 39 to overlie the upper edge of the picture frame flange 36 as shown in Figure 8, the anchor plate being suitably secured to the flange of the picture frame. The lower side of the barrel portion 39 is provided with spaced openings 18a while the intermediate portion thereof is cut away as at 19a, in a manner similar to the parts 18 and 19 in Figure 5. A U-shaped wire frame support comprising side legs 41 connected at corresponding ends by a cross foot 42 has a hook at the free end of each leg for insertion in the openings 18a while the opening 19a receives a U-shaped hanger 34a. The openings 18a are proportioned to permit limited swinging movement of the legs 41 away from the picture frame 10a, and the frame may be inverted and suspended as shown in Fig. 2a.

From the above detailed description of the invention, it is believed that the construction and operation thereof will at once be apparent, it being noted that the frame as shown in Fig. 2a may be inverted and be wall supported by the arched portion 26 of one of the supporting sections, and while there are herein shown and described the preferred embodiments of the invention, it is nevertheless to be understood that minor changes may be made therein without departing from the spirit and scope of the invention as claimed.

I claim:—

1. In a support of the character described, a picture frame, a wire frame support hingedly connected to the upper edge of the frame, an anchor plate on the frame to which the support is attached, the anchor plate having a part flatly engaging the underside of the picture frame, flange portions at the upper and lower edges thereof for engagement with parts of the picture frame and a rolled portion at the upper end of the part that flatly engages the rear side of the picture frame to constitute the hinge mounting for the wire frame support.

2. In a support of the character described, a picture frame, anchor plates respectively secured to the upper and lower edges thereof, a wire frame support formed of three sections with the end sections hinged to the respective anchor plates, each section being of substantially U-shape with hinge eye connections between the sections, and a barrel portion on each plate to facilitate the hinge mounting of the support on the picture frame.

JOSEPH KREMEN.